US008314180B2

(12) United States Patent
Ydens et al.

(10) Patent No.: US 8,314,180 B2
(45) Date of Patent: Nov. 20, 2012

(54) HETEROPHASIC PROPYLENE COPOLYMER FOR CORRUGATED SHEET AND CAST FILM APPLICATIONS

(75) Inventors: Isabelle Ydens, Trivières (BE); Alain Standaert, Brussels (BE); Olivier Lhost, Havré (BE); Jérôme Gromada, Waterloo (BE); Katty Den Dauw, Woluwé-Saint-Lambert (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 70 days.

(21) Appl. No.: 12/744,686

(22) PCT Filed: Nov. 25, 2008

(86) PCT No.: PCT/EP2008/066117
§ 371 (c)(1),
(2), (4) Date: Nov. 19, 2010

(87) PCT Pub. No.: WO2009/068514
PCT Pub. Date: Jun. 4, 2009

(65) Prior Publication Data
US 2011/0104447 A1    May 5, 2011

(30) Foreign Application Priority Data
Nov. 26, 2007   (EP) ..................................... 07121506

(51) Int. Cl.
*C08L 23/16*   (2006.01)
*C08F 4/642*   (2006.01)

(52) U.S. Cl. .......... 525/53; 525/240; 525/245; 525/249; 526/65; 526/124.2; 526/124.9; 428/182

(58) Field of Classification Search .................... 525/53, 525/240, 245, 249; 526/65, 124.2, 124.9; 428/182
See application file for complete search history.

(56) References Cited

U.S. PATENT DOCUMENTS

| 6,306,973 B1 * | 10/2001 | Takaoka et al. ............... 525/240 |
| 6,384,142 B1 * | 5/2002 | Burkhardt et al. ............ 525/191 |
| 6,610,792 B2 | 8/2003 | Albe et al. |
| 6,723,829 B1 * | 4/2004 | Malm et al. ................... 528/481 |
| 2005/0163949 A1 | 7/2005 | Vandeurzen et al. |

FOREIGN PATENT DOCUMENTS

WO    2007076918 A1   7/2007

* cited by examiner

*Primary Examiner* — Roberto Rabago

(57) ABSTRACT

The present invention concerns heterophasic propylene copolymers, comprising a propylene homopolymer (PPH) and an ethylene-propylene rubber (EPR), having a broad molecular weight distribution and a well-defined total ethylene content and a specific ratio of the intrinsic viscosities of the ethylene-propylene rubber (EPR) and the propylene homopolymer (PPH), $\eta_{EPR}/\eta_{PPH}$. The invention further concerns the process to produce such heterophasic propylene copolymers. The heterophasic propylene copolymers of the present invention are particularly suited for corrugated sheet and cast film applications.

14 Claims, No Drawings

US 8,314,180 B2

HETEROPHASIC PROPYLENE COPOLYMER FOR CORRUGATED SHEET AND CAST FILM APPLICATIONS

CROSS-REFERENCE TO RELATED APPLICATIONS

This application claims the benefit of PCT/EP2008/066117, filed Nov. 25, 2008, which claims priority from EP 07121506.5, tiled Nov. 26, 2007.

FIELD OF THE INVENTION

The present invention concerns heterophasic propylene copolymers, comprising a propylene homopolymer (PPH) and an ethylene-propylene rubber (EPR), having a broad molecular weight distribution, a well-defined total ethylene content and a specific ratio of the viscosities of the ethylene-propylene rubber (EPR) and the propylene homopolymer (PPH), $\eta_{EPR}/\eta_{PPH}$. The invention further concerns the process to produce such heterophasic propylene copolymers. The heterophasic propylene copolymers of the present invention are particularly suited for corrugated sheet and cast film applications.

THE TECHNICAL PROBLEM AND THE PRIOR ART

Heterophasic propylene copolymers, frequently also referred to as "impact copolymers" or "propylene block copolymers", are made of a propylene polymer as matrix phase, wherein a rubber is dispersed. The addition of a rubber improves the impact performance of propylene homopolymers, in particular at low temperatures. Typical commercially available heterophasic propylene copolymers are made of a propylene homopolymer matrix and an ethylene-propylene rubber.

Heterophasic propylene copolymers can be produced for example by compounding a rubber into a matrix propylene polymer. However, for large-scale industrial production the preferred production method is by sequential polymerization in a series of polymerization reactors in presence of a polymerization catalyst, an external electron donor and hydrogen for controlling the molecular weight of the polymer produced, wherein in a first step the matrix is produced by homopolymerization of propylene, and in a second step an ethylene-propylene rubber (EPR) is produced by copolymerization of propylene with ethylene.

Due to their good mechanical properties, in particular their good impact performance, heterophasic propylene copolymers have found wide application and are transformed by extrusion and injection methods. While it is already difficult enough to optimize the mechanical properties of heterophasic propylene copolymer because of the presence of the dispersed rubber and its interaction with the matrix phase, in extrusion applications the added difficulty is that processing properties and mechanical properties depend upon the same factors. Such difficulties become very evident for example in corrugated sheet, cast film, blown film, pipe and corrugated pipe.

With the continuous efforts by producers of such articles to down gauge and to run at higher throughput, there is a demand to further improve the processability and/or the mechanical properties of heterophasic propylene copolymers in these applications.

It is therefore an objective of the present invention to provide heterophasic propylene copolymers having improved processability.

It is also an objective of the present invention to provide heterophasic propylene copolymers having good processability in extrusion applications, such as for example in particularly in corrugated sheet, cast film, blown film, sheet extrusion, thermoforming, pipe and corrugated pipe.

Further, it is an objective of the present invention to provide heterophasic propylene copolymers having good mechanical properties.

BRIEF DESCRIPTION OF THE INVENTION

We have discovered that at least one of the above objectives can be met by providing a heterophasic propylene copolymer comprising a propylene homopolymer (PPH) and an ethylene-propylene rubber (EPR), wherein the heterophasic propylene copolymer has a melt flow index in the range from 1 dg/min to 2 dg/min (measured according to ISO 1133, condition L, 230° C., 2.16 kg), a molecular weight distribution $M_w/M_n$ in the range of 8.5 to 10.0 (measured on pellets) and a total ethylene content in the range from 6.0 wt % to 11.0 wt % relative to the total weight of the heterophasic propylene copolymer, wherein the EPR is present in an amount from 10.0 wt % to 16.0 wt % of the total weight of the heterophasic propylene copolymer, wherein the ratio of the intrinsic viscosities $\eta_{EPR}/\eta_{PPH}$ (measured in tetralin at 135° C.) is in the range from 1.70 to 2.00, and wherein the ratio of the amount of EPR and the total ethylene content (wt % EPR/wt % ethylene) is in the range from 1.30 to 1.90.

Further, the present invention provides corrugated sheet and cast film made with such heterophasic propylene copolymers.

The present invention also provides a process for the production of a heterophasic propylene copolymer, said heterophasic propylene copolymer comprising a propylene homopolymer (PPH) and an ethylene-propylene rubber (EPR), in presence of a Ziegler-Natta polymerization catalyst, an aluminium alkyl, an external electron donor and hydrogen comprising the steps of (a) polymerizing propylene to produce at least two propylene homopolymer fractions of different melt flow indices, wherein the ratio of the melt flow index of the fraction with the highest melt flow index and the melt flow index of the fraction with the lowest melt flow index is in the range from 1.5 to 7.0, (b) subsequently transferring the combined propylene homopolymer fractions obtained in step (a) to a further polymerization reactor, and (c) copolymerizing propylene and ethylene in said further polymerization reactor to produce an ethylene-propylene rubber (EPR), wherein the heterophasic propylene copolymer has a melt flow index (measured according to ISO 1133, condition L, 230° C., 2.16 kg) in the range from 1 dg/min to 2 dg/min, a molecular weight distribution $M_w/M_n$ in the range of 8.5 to 10.0 (measured on pellets) and a total ethylene content in the range from 6.0 wt % to 11.0 wt %, wherein the EPR is present in an amount from 10.0 wt % to 16.0 wt % of the heterophasic propylene copolymer, wherein the ratio of the intrinsic viscosities $\eta_{EPR}/\eta_{PPH}$ (measured in tetralin at 135° C.) is in the range from 1.7 to 2.0, and wherein the ratio of the amount of EPR and the total ethylene content (wt %(EPR)/wt %($C_2$)) is in the range from 1.30 to 1.90.

DETAILED DESCRIPTION OF THE INVENTION

We have now discovered that at least one of the above objectives can be met by providing heterophasic propylene copolymers having a broad molecular weight distribution, a well-defined total ethylene and certain correlations between the properties of the propylene homopolymer as matrix phase and the ethylene-propylene rubber.

The heterophasic propylene copolymers of the present invention have a melt flow index in the range from 1 dg/min to 2 dg/min (measured according to ISO 1133, condition L, 230° C., 2.16 kg).

Further, the heterophasic propylene copolymers of the present invention are characterized by a broad molecular weight distribution $M_w/M_n$. The molecular weight distribution $M_w/M_n$ is in the range from 8.5 to 10.0 when measured on pellets. Molecular weights and molecular weight distribution can be determined for example by using Size Exclusion Chromatography (SEC).

The heterophasic propylene copolymers of the present invention are also characterized by a total ethylene content in the range from 6.0 wt % to 11.0 wt %, relative to the total weight of the heterophasic propylene copolymer. Preferably, the total ethylene content is in the range from 7.0 wt % to 10.0 wt % and most preferably in the range from 7.5 wt % to 9.0 wt %, relative to the total weight of the heterophasic propylene copolymer. The total ethylene content can easily be determined by analytical methods, such as by IR- or NMR-analysis.

The heterophasic propylene copolymers of the present invention comprise a propylene homopolymer (PPH) and an ethylene-propylene rubber (EPR). Preferably, the propylene homopolymer (PPH) and the ethylene-propylene rubber (EPR), when taken together, comprise at least 90.0 wt % of the heterophasic propylene copolymer. More preferably, they comprise at least 95.0 wt % or 97.0 wt % or 99.0 wt %, even more preferably at least 99.5 wt % and most preferably at least 99.8 wt % of the heterophasic propylene copolymer.

The ethylene-propylene rubber (EPR) is present in an amount from 10.0 wt % to 16.0 wt % of the total weight of the heterophasic propylene copolymer. Preferably, the ethylene-propylene rubber (EPR) is present in an amount from 11.0 wt % to 15.0 wt % and more preferably in an amount from 12.0 wt % to 14.0 wt % of the total weight of the heterophasic propylene copolymer. The amount of ethylene-propylene rubber is determined as the acetone insoluble fraction of the xylene soluble fraction. The acetone insoluble fraction of the xylene soluble fraction is obtained by dissolving the heterophasic propylene copolymer in refluxing xylene, cooling the solution to 25° C., filtering the solution, and subsequent agitation of the solution and acetone, which results in forming a precipitate. Said precipitate, which represents the acetone insoluble fraction of the xylene soluble fraction of the heterophasic propylene copolymer, is collected on a filter, dried and weighed.

For the heterophasic propylene copolymers of the present invention it is essential that the ratio of the intrinsic viscosities (measured in tetralin at 135° C.) of the ethylene-propylene rubber (EPR) and the propylene homopolymer (PPH), $\eta_{EPR}/\eta_{PPH}$, is in the range from 1.70 to 2.00. Preferably, the ratio is in the range from 1.75 to 1.95 and most preferably in the range from 1.80 to 1.90.

Furthermore, it is essential that the heterophasic propylene copolymers of the present invention have a ratio of the total amount of ethylene-propylene rubber (EPR) and total ethylene content, wt %(EPR)/wt %($C_2$), in the range from 1.30 to 1.90. Preferably, wt %(EPR)/wt %/($C_2$) is in the range from 1.35 to 1.85, more preferably in the range from 1.40 to 1.80, even more preferably in the range from 1.45 to 1.65 and most preferably in the range from 1.50 to 1.70.

Preferably, the heterophasic propylene copolymers of the present invention are further characterized by a propylene homopolymer matrix (PPH) having a xylene solubles content of at most 2.5 wt %, more preferably of at most 2.0 wt %, relative to the total weight of the propylene homopolymer.

Preferably, the propylene homopolymer matrix (PPH) of the heterophasic propylene copolymers of the present invention comprises at least two propylene homopolymer fractions of different molecular weight, i.e. different melt flow index (measured according to ISO 1133, condition L, 230° C., 2.16 kg). It is preferred that the ratio of the melt flow index of the fraction with the highest melt flow index and the melt flow index of the fraction with the lowest melt flow index, MFI (PPH-high)/MFI(PPH-low), is in the range from 1.5 to 7.0, preferably in the range from 2.0 to 6.0, more preferably in the range from 2.5 to 5.5, even more preferably in the range from 2.5 to 5.0, and most preferably in the range from 2.5 to 4.5. For the purpose of the present invention the term "propylene homopolymer fraction" is used to identify a propylene homopolymer that is produced under a single average hydrogen to propylene ratio in a single polymerization reactor using a Ziegler-Natta polymerization catalyst as defined in the present application. The molecular weight of the polymer chains, and in consequence of the melt flow of the propylene polymer, is regulated by the addition of hydrogen and controlling the ratio of the feed rates of propylene and hydrogen, and consequentially by changing the hydrogen concentration in the polymerization reactor.

The heterophasic propylene copolymers of the present invention may also be used in a composition, preferably a composition comprising other polyolefins, such as for example propylene homopolymers, propylene random copolymers, other heterophasic propylene copolymers, which may or may not be according to the present invention, polyethylene and the likes. In such a composition it is preferred that the heterophasic propylene copolymers of the present invention comprise at least 50 wt % of the composition.

The heterophasic propylene copolymers of the present invention may contain additives such as, by way of example, antioxidants, light stabilizers, acid scavengers, lubricants, antistatic additives, nucleating/clarifying agents, colorants. An overview of such additives may be found in Plastics Additives Handbook, ed. H. Zweifel, 5$^{th}$ edition, 2001, Hanser Publishers.

Preferably, the heterophasic propylene copolymers may contain one or more fluoroelastomers as processing aid. More preferably, the heterophasic propylene copolymers may contain one or more fluoroelastomers at a level in the range from 100 ppm to 1000 ppm. These fluoroelastomers are generally copolymers of vinylidene fluoride and hexafluoropropylene. Such fluoroelastomers are for example commercially available from 3M under the Dynamar or Dyneon trademarks, from DuPont-Dow Elastomers under the Viton trademark or from Arkema under the Kynar Flex trademark. Further information can be found in Plastics Additive Handbook, 5$^{th}$ edition, ed. Dr. Hans Zweifel, Hanser Publishers, Munich, 2001, chapter 6, particularly chapters 6.3.2 and 6.12.

The heterophasic propylene copolymers of the present invention are used in the production of molded and extruded articles. Preferably, the heterophasic propylene copolymers are used in the production of corrugated sheet, cast film, blown film, sheet, thermoformed articles, pipes and corrugated pipes. Corrugated sheet and cast film are the more preferred applications, with corrugated sheet being the most preferred one. All of these applications are well known to the skilled person and need not be explained in detail.

For the purposes of the present invention we define a corrugated sheet as comprising two sheets that are kept at a distance by supporting elements, i.e. ribs.

The heterophasic propylene copolymers of the present invention are characterized by excellent mechanical properties. It has been quite surprising that these excellent mechanical properties could be obtained while at the same time drastically improving the processability in extrusion applications, such as in the production of corrugated sheet, cast film, blown film, sheet, thermoformed articles, pipes and corrugated pipes. In particular the processability in the production of corrugated sheet has been improved beyond expectation.

A further surprise with the heterophasic propylene copolymers of the present invention is that they are characterized by a low gel count. This makes these heterophasic propylene copolymers very suitable for the production of and the use in articles, for which surface aspects are of importance, such as corrugated sheet, cast film, blown film, sheet, thermoformed articles, pipes and corrugated pipes. Further, the low number of gels in combination with excellent mechanical properties offers a large number of possibilities for optimization of products and/or production processes related to down gauging or increasing line speeds, thus making the production processes more economical.

The heterophasic propylene copolymers of the present invention are produced in presence of a Ziegler-Natta polymerization catalyst, an aluminium alkyl, an external electron donor (ED) and hydrogen.

A Ziegler-Natta catalyst comprises a titanium compound, which has at least one titanium-halogen bond, and an internal donor, both supported on magnesium halide in active form. The preferred internal donor used in the present invention is a phthalate. Suitable phthalates are selected from the alkyl, cycloalkyl and aryl phthalates, such as for example diethyl phthalate, diisobutyl phthalate, di-n-butyl phthalate, dioctyl phthalate, diphenyl phthalate and benzylbutyl phthalate. Such catalysts are for example commercially available from Basell under the Avant trade name.

The organoaluminium compound is advantageously an Al-alkyl compound of the Al-trialkyls family, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. Al-triethyl is preferred. Advantageously, the Al-trialkyl has a hydride content, expressed as $AlH_3$, of less than 1.0 wt % with respect to the Al-trialkyl. More preferably, the hydride content is less than 0.5 wt %, and most preferably the hydride content is less than 0.1 wt %.

The organoaluminium compound is used in such an amount as to have a molar ratio Al/Ti in the range from 1 to 1000. Preferably, the upper limit is 200.

Suitable external electron donors (ED) include certain silanes, ethers, esters, amines, ketones, heterocyclic compounds and blends of these. It is preferred to use a 1,3-diether or a silane. It is most preferred to use a silane of the general formula

$R^a{}_p R^b{}_q Si(OR^c)_{(4-p-q)}$ wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl) Si(OCH$_3$)$_2$ (referred to as "C donor"), (phenyl)$_2$Si(OCH$_3$)$_2$ and (cyclopentyl)$_2$Si(OCH$_3$)$_2$ (referred to as "D donor").

The molar ratio of organoaluminium compound to external donor ("Al/ED") ranges advantageously between 1 and 1000. The upper limit of the Al/ED ratio preferably is at most 800, more preferably at most 600 and most preferably at most 400. The lower limit of the Al/ED molar ratio preferably is at least 5, more preferably at least 10.

Hydrogen is used to control the chain lengths of the propylene polymers. For the production of propylene polymers with higher MFI, i.e. with lower average molecular weight and shorter polymer chains, the concentration of hydrogen in the polymerization medium needs to be increased. Inversely, the hydrogen concentration in the polymerization medium has to be reduced in order to produce propylene polymers with lower MFI, i.e. with higher average molecular weight and longer polymer chains.

The polymerization of propylene is carried out according to known techniques. The polymerization can for example be carried out in liquid propylene as reaction medium. It can also be carried out in a diluent, such as an inert hydrocarbon (slurry polymerization) or in the gas phase.

The production process for the heterophasic propylene copolymers, said heterophasic propylene copolymer comprising a propylene homopolymer (PPH) and an ethylene-propylene rubber (EPR), in presence of a Ziegler-Natta polymerization catalyst, an aluminium alkyl, an external electron donor (ED) and hydrogen comprises the steps of
  (a) polymerizing propylene to produce at least two propylene homopolymer fractions of different melt flow,
  (b) subsequently transferring the combined propylene homopolymer fractions obtained in step (a) to a further polymerization reactor, and
  (c) copolymerizing propylene and ethylene in said further polymerization reactor to produce an ethylene-propylene rubber (EPR).

It is clear to the skilled person that either of steps (a) and (c) can be performed in more than one polymerization reactor.

For the production of the heterophasic propylene copolymers of the present invention it is essential that the ratio of the melt flow indices of the propylene homopolymer fractions produced in step (a) with the highest melt flow index and the lowest melt flow index is in the range from 1.5 to 7.0. Preferably said ratio is in the range from 2.0 to 6.0, more preferably in the range from 2.5 to 5.5, even more preferably in the range from 2.5 to 5.0, and most preferably in the range from 2.5 to 4.5. For the purpose of the present invention the term "propylene homopolymer fraction" is used to identify a propylene homopolymer that is produced under a single average hydrogen to propylene ratio in a single polymerization reactor using a Ziegler-Natta polymerization catalyst as defined in the present application. The molecular weight of the polymer chains, and in consequence of the melt flow of the propylene polymer, is regulated by the addition of hydrogen and controlling the ratio of the feed rates of propylene and hydrogen, and consequentially by changing the hydrogen concentration in the polymerization reactor.

Polymerization conditions, reactants' feed rates etc. are set in such a way as to result in the production of the heterophasic propylene copolymers with the properties mentioned above. This is well within the skills of the skilled person so that no further details need be given.

For the production of heterophasic propylene copolymers the polymerization is preferably carried out in two or more polymerization reactors in series, employing liquid propylene as reaction medium and then in one or more gas phase reactors in series, as is done for example in a propylene polymer production line based on Spheripol technology. It is preferred to produce a heterophasic propylene copolymer sequentially in two or more loop reactors and then in one or more gas phase reactors. It is most preferred to employ only one gas phase reactor.

In the case that the heterophasic propylene copolymer is produced in a polymer production line with three polymerization reactors, the first two reactors are used to polymerize propylene to form the polypropylene homopolymer (PPH) and the third reactor is used to copolymerize propylene and ethylene so as to produce the ethylene-propylene rubber (EPR). Preferably, the contribution of the first reactor to the total of the propylene homopolymer is in the range from 40 wt % to 60 wt %, preferably in the range from 50 wt % to 60 wt %.

For the present invention propylene homopolymers and random copolymers are preferably produced by polymerization in liquid propylene at temperatures in the range from 20° C. to 100° C. Preferably, temperatures are in the range from 60° C. to 80° C. The pressure can be atmospheric or higher. It is preferably between 25 and 50 bar.

The heterophasic propylene copolymers are recovered as a powder after the last of the sequential polymerization reactors and can then be pelletized or granulated.

EXAMPLES

The advantages of the heterophasic propylene copolymers of the present invention over those of the prior art are shown in the following examples.

Test Methods

Melt flow (MFI) is measured according to norm ISO 1133, condition L, 230° C., 2.16 kg.

Xylene solubles (XS) are determined as follows: Between 4.5 and 5.5 g of propylene polymer are weighed into a flask and 300 ml xylene are added. The xylene is heated under stirring to reflux for 45 minutes. Stirring is continued for 15 minutes exactly without heating. The flask is then placed in a thermostat bath set to 25° C.+/−1° C. for 1 hour. The solution is filtered through Whatman n° 4 filter paper and exactly 100 ml of solvent are collected. The solvent is then evaporated and the residue dried and weighed. The percentage of xylene solubles ("XS"), i.e. the amount of the xylene soluble fraction, is then calculated according to XS(in wt %)=(Weight of the residue/Initial total weight of PP)*300 with all weights being in the same units.

Acetone insolubles are determined as follow: 100 ml of the filtrate of the solution in xylene (see above) and 700 ml of acetone are agitated overnight at room temperature in a hermetically sealed flask, during which time a precipitate is formed. The precipitate is collected on a metal mesh filter with a mesh width of 0.056 mm, dried and weighed. The percentage of acetone insolubles ("AcIns"), i.e. the amount of the acetone insoluble fraction, is then calculated according to AcIns(in wt %)=(Weight of the residue/Initial weight of PP)*300 with all weights being in the same units.

The amount of ethylene-propylene rubber in heterophasic propylene copolymer is determined as the acetone insoluble fraction of the xylene soluble fraction.

Molecular weights and molecular weight distribution are determined by Size Exclusion Chromatography (SEC) at high temperature (145° C.). A 10 mg PP sample is dissolved at 160° C. in 10 ml of trichlorobenzene (TCB, technical grade) for 1 hour. The analytical conditions for the Alliance GPCV 2000 from WATERS are:

Volume: +/−400 µl

Injector temperature: 140° C.
Column and detector: 145° C.
Column set: 2 Shodex AT-806MS and 1 Styragel HT6E
Flow rate 1 ml/min
Detector: Refractive index
Calibration: Narrow standards of polystyrene
Calculation: Based on Mark-Houwink relation ($\log(M_{PP})$ =$\log(M_{PS})$−0.25323)

The total ethylene content (wt % $C_2$) relative to the total weight of the heterophasic propylene copolymer is determined by NMR analysis of pellets according to the method described by G. J. Ray et al. in Macromolecules, vol. 10, n° 4, 1977, p. 773-778.

The intrinsic viscosity of the propylene homopolymer (PPH) is determined on a collected sample of PPH produced at the end of the homopolymerization process. The intrinsic viscosity is determined in a capillary viscometer in tetralin at 135° C.

The intrinsic viscosity of the ethylene-propylene rubber (EPR) is determined using the acetone insoluble fraction of the xylene soluble fraction of the heterophasic propylene copolymer. The intrinsic viscosity is determined in a capillary viscometer in tetralin at 135° C.

The Critical Shear rate is determined using a piston-driven capillary rheometer fitted with a round hole die having a length of 15 mm and a diameter of 0.752 mm. The sample is melted in the barrel of the rheometer to a temperature of 230° C. Then the piston is advanced from high to low speed—from high to low shear rate. Generally the sweeping range is 1400 $s^{-1}$ to 25 $s^{-1}$, but it can be enlarged if necessary. For each applied shear rate, a strand is cut and observed. The critical shear rate is the minimum shear rate where the shark skin melt fracture is observed.

Flexural modulus was measured according to ISO 178.
Notched Izod impact strength was measured according to ISO 180.

Gels, i.e. number of gels per $m^2$, are determined as follows: The heterophasic propylene copolymer is molten and extruded through a 10 cm slit die to form a film. This film is passed underneath a digital camera system connected to a computer. The digital images are analyzed by a computer program to determine the number of gels.

Heterophasic Propylene Copolymers

The heterophasic propylene copolymers used in the examples were produced on an industrial propylene polymerization plant having two loop reactors and a gas phase reactor (GPR) in series. As catalyst, a Ziegler-Natta catalyst with a phthalate as internal donor, was used. External donor was $(cyclopentyl)_2Si(OCH_3)_2$ (referred to as "D donor"). Further polymerization conditions are given in table 1. Properties of the propylene homopolymer (PPH) and the ethylene-propylene rubber (EPR) are given in table 2. Properties of the heterophasic propylene copolymers are given in table 3.

TABLE 1

|  | Unit | Example 1 | Comp. ex. 1 | Comp. ex. 2 |
| --- | --- | --- | --- | --- |
| Catalyst |  | Phthalate | Phthalate | Phthalate |
| External Donor (ED) |  | D | D | D |
| Catalyst Activation |  |  |  |  |
| TEAL/Propylene | g/kg | 0.14 | 0.14 | 0.14 |
| TEAL/ED | g/g | 4.8 | 5 | 5.0 |
| Loop 1 - PPH |  |  |  |  |
| Hydrogen | vpm | 670 | 1000 | 340 |
| Contribution Loop1 | % | 56 | 60 | 47 |

TABLE 1-continued

|  | Unit | Example 1 | Comp. ex. 1 | Comp. ex. 2 |
|---|---|---|---|---|
| MFI Loop 2 - PPH | dg/min | 1.5 | 2.3 | 0.7 |
| Hydrogen | vpm | 2900 | 1000 | 5300 |
| MFI ratio = $MFI_{Loop\,2}/MFI_{Loop\,1}$ |  | 3 | 1 | 11 |
| GPR-EPR |  |  |  |  |
| $H_2/C_2$ |  | 0.020 | 0.022 | 0.034 |
| $C_2/C_2 + C_3$ |  | 0.41 | 0.41 | 0.41 |

TABLE 2

|  | Unit | Example 1 | Comp. ex. 1 | Comp. ex. 2 |
|---|---|---|---|---|
| PPH |  |  |  |  |
| MFI | dg/min | 2.45 | 2.3 | 2.5 |
| Xylene solubles | wt % | 2.0 | 2.1 | 2.2 |
| $\eta_{PPH}$ | dl/g | 2.2 | 2.2 | 2.1 |
| EPR |  |  |  |  |
| $\eta_{EPR}$ | dl/g | 4.1 | 3.6 | 3.2 |

TABLE 3

|  | Unit | Example 1 | Comp. ex. 1 | Comp. ex. 2 |
|---|---|---|---|---|
| MFI | dg/min | 1.6 | 1.4 | 1.3 |
| $C_2$ content | wt % | 8.4 | 7.9 | 9.3 |
| Gels | $m^{-2}$ | 67 | 44 | 140 |
| Acetone Insoluble content | wt % | 13.1 | 13.4 | 14.7 |
| Xylene Solubles of PPH | wt % | 2.0 | 2.1 | 2.2 |
| SEC (pellets) |  |  |  |  |
| $M_n$ | kDa | 53 | 57 | 48 |
| $M_w$ | kDa | 478 | 468 | 498 |
| $M_z$ | kDa | 2100 | 2007 | 2195 |
| $M_w/M_n$ |  | 9 | 8.3 | 9.9 |
| Critical shear rate (230° C.) | $s^{-1}$ | 700 | 625 | 400 |
| Flexural modulus | MPa | 1210 | 1240 | 1367 |
| Izod, notched @ 23° C. | $kJ/m^2$ | 46 | 49 | 67 |

It has been quite surprising that the number of gels that was observed for example 1, even though the heterophasic propylene copolymer has a broad molecular weight distribution $M_w/M_n$, and a high EPR intrinsic viscosity, is close to that of comparative example 1, which has a normal molecular weight distribution $M_w/M_n$ and a lower EPR intrinsic viscosity.

It has been even more surprising that the critical shear rate for example 1 was much higher than for either comparative example 1 or comparative example 2. The higher critical shear rate indicates that the heterophasic propylene copolymer of the present invention can be run at higher processing rates than the comparative heterophasic propylene copolymers. From the behavior of the comparative examples it is not possible to predict that the heterophasic propylene copolymers of the present invention would show such a dramatic improvement in processability.

Corrugated Sheet

The heterophasic propylene copolymers described above were tested on an industrial line having a die length of about 2 m in the production of corrugated sheet having a weight of 300 gsm. Processing conditions are indicated in table 4. For the comparison of the maximum line speed comparative example 1 was taken as reference and line speeds for the other examples are expressed as percentages of the reference line speed for comparative example 1.

TABLE 4

|  |  | Example 1 | Comp. ex. 1 | Comp. ex. 2 |
|---|---|---|---|---|
| Extruder temperature | ° C. | 220 | 225-230 | 245 |
| Die temperature | ° C. | 220-225 | 225 | 245 |
| Max line speed | % | 121 | 100 | 86 |

The results obtained with the heterophasic propylene copolymers of the present invention in the production of a corrugated sheet confirm the above-discussed results for the critical shear rate. Example 1, which is according to the present invention, has resulted in much increased maximum line speeds on an industrial line.

The invention claimed is:

1. Heterophasic propylene copolymer comprising a propylene homopolymer (PPH) and an ethylene-propylene rubber (EPR), wherein the heterophasic propylene copolymer has a melt flow index in the range from 1 dg/min to 2 dg/min (measured according to ISO 1133, condition 1,230° C., 2.16 kg), a molecular weight distribution $M_{w/Mn}$ in the range from 8.5 to 10.0 (measured on pellets) and a total ethylene content in the range from 6.0 wt % to 11.0 wt % relative to the total weight of the heterophasic propylene copolymer, wherein the EPR is present in an amount from 10.0 wt % to 16.0 wt % of the total weight of the heterophasic propylene copolymer, wherein the ratio of intrinsic viscosities $\eta_{EPR}/\eta_{PPH}$ (measured in tetralin at 135° C.) is in the range from 1.70 to 2.00, and wherein the ratio of the amount of EPR and the total ethylene content (wt % EPR/wt % ethylene) is in the range from 1.30 to 1.90.

2. Heterophasic propylene copolymer of claim 1, wherein the total ethylene content is in the range from 7.0 wt % to 10.0 wt % relative to the total weight of the heterophasic propylene copolymer.

3. Heterophasic propylene copolymer of claim 1, wherein the EPR is present in an amount from 11.0 wt % to 15.0 wt %, preferably in an amount from 12.0 wt % to 14.0 wt % of the total weight of the heterophasic propylene copolymer.

4. Heterophasic propylene copolymer of claim 1, wherein the ratio of the intrinsic viscosities $\eta_{EPR}/\eta_{PPH}$ is in the range from 1.75 to 1.95.

5. Heterophasic propylene copolymer of claim 1, wherein the ratio of the amounts of EPR and total ethylene content is in the range from 1.35 to 1.85.

6. Heterophasic propylene copolymer of claim 1, wherein the propylene homopolymer (PPH) has a xylene solubles content of at most 2.5 wt %, relative to the total weight of the propylene homopolymer.

7. Heterophasic propylene copolymer of claim 1, wherein the propylene homopolymer (PPH) comprises at least two propylene homopolymer fractions of different melt flow index (measured according to ISO 1133, condition L, 230° C., 2.16 kg).

8. Heterophasic propylene copolymer of claim 1, wherein the ratio of the melt flow index of the fraction with the highest melt flow index and the melt flow index of the fraction with the lowest melt flow index is in the range from 1.5 to 7.0.

9. Heterophasic propylene copolymer of claim 1, wherein the propylene homopolymer (PPH) and the ethylene-propylene copolymer (EPR), when taken together, comprise at least 90.0 wt % of the heterophasic propylene copolymer.

10. Corrugated sheet comprising the heterophasic propylene copolymer of claim 1.

11. Cast film comprising the heterophasic propylene copolymer of claims 1.

12. Process for the production of a heterophasic propylene copolymer, said heterophasic propylene copolymer comprising a propylene homopolymer (PPH) and an ethylene-propylene rubber (EPR), in presence of a Ziegler-Nitta polymerization catalyst, an aluminium alkyl, an external electron donor and hydrogen comprising the steps of
(a) polymerizing propylene. to produce at least two propylene homopolymer fractions of different melt flow indices, wherein the ratio of the melt flow index of the fraction with the highest melt flow index and the melt flow index of the fraction with the lowest melt flow index is in the range from 1.5 to 7.0,
(b) subsequently transferring the combined propylene homopolymer fractions obtained in step (a) to a further polymerization reactor, and
(c) copolymerizing propylene and ethylene in said further polymerization reactor to produce an ethylene-propylene rubber (EPR),
wherein the heterophasic propylene copolymer has a melt flow index (measured according to ISO 1133, condition L, 230° C., 2.16 kg) in the range from 1 dg/min to 2 dg/min, a molecular weight distribution $M_w/M_n$ in the range of 8.5 to 10.0 (measured on pellets) and a total ethylene content in the range from 6.0 wt % to 11.0 wt %,
wherein the EPR is present in an amount from 10.0 wt % to 16.0 wt % of the heterophasic propylene copolymer, wherein the ratio of the intrinsic viscosities $\eta_{EPR}/\eta_{PPH}$ (measured in-tetralin at 135° C.) is in the range from 1.7 to 2.0, and wherein the ratio of the amount of EPR and total ethylene content (wt %(EPR)/wt %($C_2$)) is in the range from 1.30 to 1.90.

13. Process of claim 12, further including the steps of
(d) melting the heterophasic propylene copolymer in an extruder, and
(e) extruding the molten heterophasic propylene copolymer through a corrugated sheet die.

14. Process of claim 12, further including the steps of
(d) melting the heterophasic propylene copolymer in an extruder, and
(e) extruding the molten heterophasic propylene copolymer through a flat film die or through a circular filM die.

* * * * *